United States Patent [19]
Simon et al.

[11] 4,282,461
[45] Aug. 4, 1981

[54] TELEVISION RASTER CENTERING AID

[75] Inventors: Paul B. Simon, Lititz; Robert L. Barbin, Lancaster, both of Pa.

[73] Assignee: RCA Corporation, New York, N.Y.

[21] Appl. No.: 98,696

[22] Filed: Nov. 29, 1979

[51] Int. Cl.³ .......................................... H01J 29/54
[52] U.S. Cl. ..................... 315/398; 315/384
[58] Field of Search .............. 315/398, 384, 385, 386; 358/139

[56] References Cited

U.S. PATENT DOCUMENTS

| | | | |
|---|---|---|---|
| 3,541,255 | 11/1970 | Yazigi | 358/139 |
| 3,917,902 | 11/1975 | Olson | 358/139 |
| 4,160,935 | 7/1979 | Groot et al. | 315/370 |

*Primary Examiner*—Theodore M. Blum

*Attorney, Agent, or Firm*—Eugene M. Whitacre; Paul J. Rasmussen; Scott J. Stevens

[57] ABSTRACT

A television raster centering aid comprises means for blanking a horizontal scan line located at the center of the vertical deflection field. In an illustrative embodiment, an operational amplifier is used to indicate the presence of the deflection field center based on the polarity of the current in the vertical deflection windings. A gating circuit receives information from the operational amplifier and from a source of horizontal synchronizing pulses. The gating circuit then generates a signal which is used to blank a horizontal scan line located at the vertical deflection center. In one embodiment the raster centering aid is used in a yoke adjustment machine for blanking a scan line in a flat-field video display.

8 Claims, 2 Drawing Figures

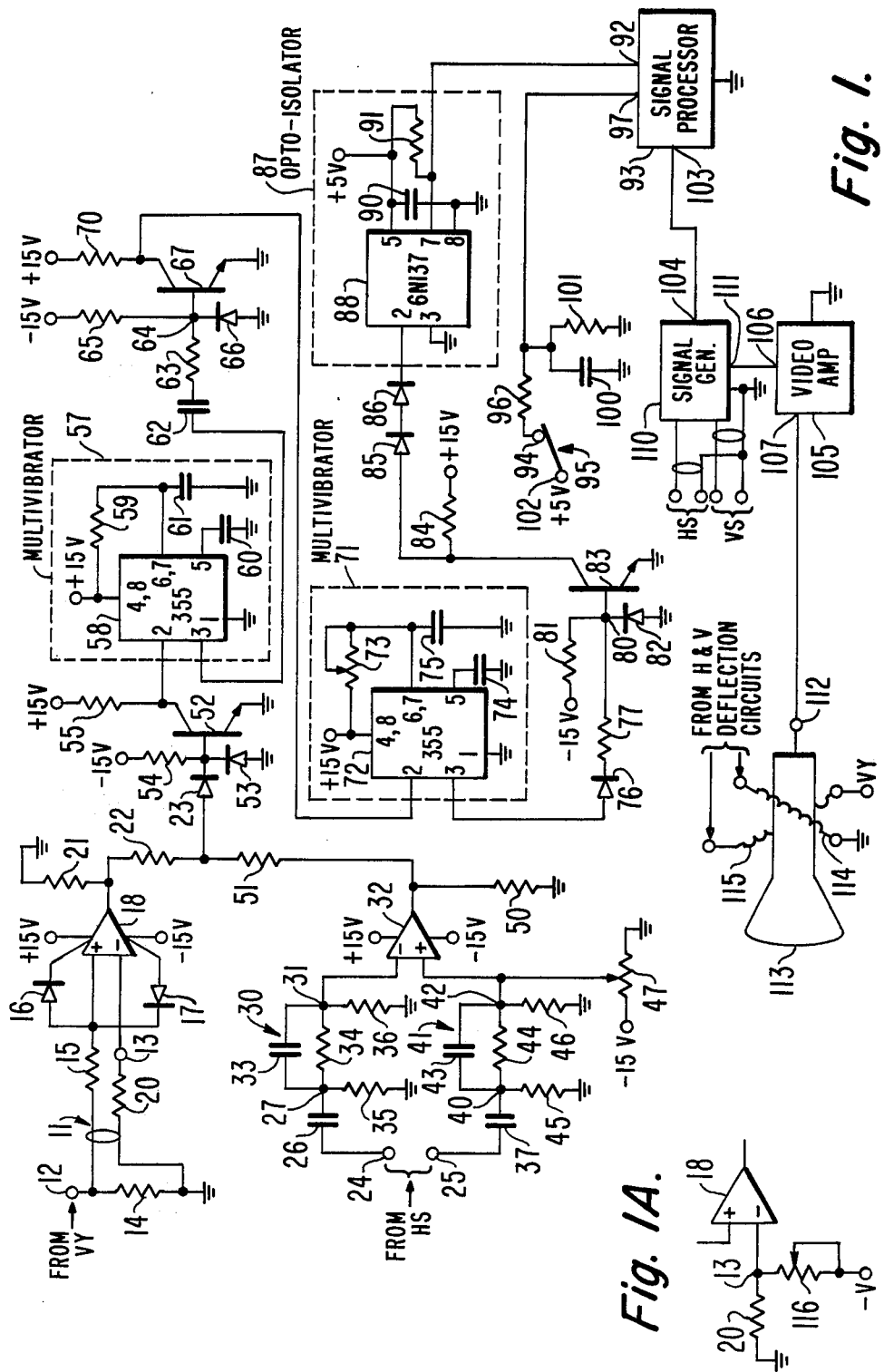

TELEVISION RASTER CENTERING AID

This invention relates to a method and apparatus for affecting the centering of a raster on a television screen.

A television receiver forms a raster by scanning an electron beam across the phosphor-coated display screen of the picture tube or kinescope. In conventional color television receivers, three electron beams, originating from different locations, pass through a shadow mask at different angles and strike the display screen of a color kinescope at different spots. It is important that the electrons from the red, green and blue designated beams strike only their respective color-producing phosphor elements. The extent to which this occurs determines the purity of the rasters produced by each of the three beams. Permanent magnet rings placed around the neck of the tube behind the yoke can influence the paths of the beams in order to improve purity.

It is also important that the respective beams of the color kinescope converge at a common region of the screen throughout the raster scanning process. Deflection yokes can now be manufactured which substantially converge the three electron beams over the entire display screen. Minor corrections are often necessary, however, primarily to converge the beams along the screen edges and in the corners. These corrections can be made by adjustments, which may include moving the yoke with respect to the tube neck, adjustment of additional magnetic rings placed around the neck of the tube, and positioning of permeable tabs to shunt the deflection fields where desired. These corrections are often done during final assembly of yoke-kinescope combinations by using a yoke adjustment machine (YAM). The YAM allows the operator to make the necessary adjustments to the yoke and associated kinescope neck components by controls on the front panel of the YAM. These adjustments are made by a system of gears, belts and pulleys which interact with the yoke and kinescope neck components. The YAM greatly improves the efficiency of the operator. By viewing raster displays, the operator can determine which yoke adjustments are necessary and by manipulating the proper YAM controls, produce rasters having the least amount of overall distortion.

It is known that vertical raster centering can be accomplished by collapsing the vertical scan to produce a single illuminated horizontal line with zero vertical deflection, and then aligning this illuminated line with the physical center of the screen by adjusting permanent magnets located on the picture tube neck. The permanent magnets used to adjust purity can also be used for raster centering purposes by controlling the orientation and strength of the magnet field. Changing the magnetic field to center the raster vertically may also change the magnitude of the vertical component of the magnetic field. This vertical component moves the beams in a horizontal direction, therefore affecting raster purity. An iterative series of adjustments of the magnets may be necessary to achieve both optimum purity and vertical raster centering. Using a collapsed vertical scan for raster centering is undesirable, since the effect of raster centering adjustments on purity is not observable.

It is therefore desirable to be able to easily monitor the relationship between raster centering and purity to achieve the correct raster characteristics.

The present invention is directed to the generation of a black horizontal scan line at the vertical deflection center in a flat-field raster. A flat-field raster shows the entire area scanned by the electron beams and is displayed during purity adjustment to determine overall screen purity. By providing a black line in the flat-field raster, raster purity and vertical centering can be observed simultaneously. Adjustments for optimum raster appearance can then be made easily.

In an illustrative embodiment of the present invention, an operational amplifier samples the current in the vertical deflection winding of the yoke and changes state as the current changes polarity at the center of the raster. The operational amplifier output is provided to the input of an AND circuit, along with horizontal sync information. The AND circuit generates a pulse corresponding to the beginning of the first horizontal scan line following the vertical deflection center. This pulse is then processed to provide a suitable signal to the line blanking circuits. The location of the black line can then be compared to the physical center of the screen and adjusted if necessary to provide satisfactory raster centering and the proper beam landing for purity.

In the accompanying drawing:

FIG. 1 illustrates, partially schematically and partically by block representation, a raster centering aid constructed according to the present invention; and FIG. 1A illustrates schematically a modification of the apparatus of FIG. 1, in accordance with another embodiment of the present invention.

Referring to FIG. 1, there is shown a circuit for blanking a video line occurring at the center of the vertical scan. The circuit comprises a coaxial input cable 11 having a terminal 12. Terminal 12 is connected in series with the vertical coils of the deflection yoke. Resistor 14 is connected between terminal 12 and ground. Cable 11 also comprises a pair of output terminals, connected through the cable to input terminal 12 and ground. One terminal of a resistor 15 is connected to the output terminal of cable 11 corresponding to input 12. The other end of resistor 15 is connected to the anode of a diode 16, the cathode of a diode 17 and the noninverting input of an operational amplifier 18. The cathode of diode 16 is connected to the positive supply input terminal of operational amplifier 18, and the anode of diode 17 is connected to the negative supply input terminal of operational amplifier 18. The output terminal of cable 11 corresponding to ground is connected to one terminal of a resistor 20. The other terminal 13 of resistor 20 is connected to the inverting input of operational amplifier 18. The output of operational amplifier 18 is connected through resistor 21 to ground and through resistor 22 to the anode of diode 23.

The circuit also comprises a pair of input terminals 24 and 25. Input terminal 24 is connected through capacitor 26 to input terminal 27 of a pi-network 30. Output terminal 31 of pi-network 30 is connected to the inverting input of operational amplifier 32. Pi-network 30 comprises the parallel combination of capacitor 33 and resistor 34 connected between terminals 27 and 31, with an additional resistor 35 connected from terminal 27 to ground and an additional resistor 36 connected from terminal 31 to ground.

Similarly, input terminal 25 is coupled through capacitor 37 to input terminal 40 of pi-network 41. Output terminal 42 of pi-network 41 is connected to the noninverting input of operational amplifier 32. Pi-network 41, constructed in the same manner as pi-network 30, comprises the parallel combination of capacitor 43 and resistor 44 with resistors 45 and 46 coupled to ground from terminals 40 and 42, respectively. Output terminal 42 is also connected to the wiper of potentiometer 47. The output of operational amplifier 32 is coupled through resistor 50 to ground and through resistor 51 to the anode of diode 23.

The cathode of diode 23 is coupled to the base of an npn transistor 52, the cathode of diode 53 and one terminal of a resistor 54. The anode of diode 53 is connected to ground and the other terminal of resistor 54 is connected to a supply of negative potential. The emitter of transistor 52 is coupled to ground. The collector of transistor 52 is coupled through a resistor 55 to a source of positive potential.

The collector of transistor 52 is also connected to the input terminal of a multivibrator 57. Multivibrator 57 comprises an integrated circuit 58 of the type designated as 355. The input terminal of multivibrator 57 corresponds to terminal 2 of integrated circuit 58. Multivibrator 57 also comprises a resistor 59 and capacitors 60 and 61. Terminals 4 and 8 of integrated circuit 58 are connected to a source of positive potential. Terminal 1 is connected to ground. Terminal 5 is coupled through capacitor 60 to ground. Resistor 59 is connected between terminals 6 and 7 and the source of positive potential. Terminals 6 and 7 are also coupled to ground through capacitor 61. Terminal 3 of integrated circuit 58, corresponding to the output terminal of multivibrator 57, is coupled through a capacitor 62 and a resistor 63 to a junction 64. Junction 64 is coupled through a resistor 65 to a source of negative potential and through a reverse-connected diode 66 to ground. Junction 64 is also connected to the base of a transistor 67. The emitter of npn transistor 67 is connected to ground. The collector of transistor 67 is coupled through a resistor 70 to a source of positive potential.

The collector of transistor 67 is also connected to the input terminal of a multivibrator 71. Multivibrator 71 comprises an integrated circuit 72 of the type designated as 355. The input terminal of multivibrator 71 corresponds to terminal 2 of integrated circuit 72. Multivibrator 71 also comprises a variable resistor 73 and capacitors 74 and 75. Terminal 1 of integrated circuit 72 is connected to ground. Terminal 5 is coupled through capacitor 74 to ground. Terminals 4 and 8 are connected to a source of positive potential. Terminals 6 and 7 are coupled through a capacitor 75 to ground. A potentiometer 73 is connected between terminals 6 and 7 and the source of positive potential.

Terminal 3 of integrated circuit 72, corresponding to the output terminal of multivibrator 71, is coupled through a forward-connected diode 76 and a resistor 77 to a junction 80. The junction 80 is coupled through a resistor 81 to a source of negative potential, through a reverse-connected diode 82 to ground, and to the base of an npn transistor 83. The emitter of transistor 83 is connected to ground. The collector of transistor 83 is coupled through a resistor 84 to a source of positive potential and through serially-connected diodes 85 and 86 to an input terminal of opto-isolator 87. Opto-isolator 87 comprises integrated circuit 88. Opto-isolator 87 also comprises capacitor 90 and resistor 91. Integrated circuit 88 is of a type designated as 6N137. Terminal 2 of integrated circuit 88 corresponds to the input terminal of opto-isolator 87.

Terminals 3 and 8 of the integrated circuit 88 are connected to ground. Terminal 5 is coupled to a source of positive potential. Capacitor 90 is connected between terminals 5 and 8. Resistor 91 is coupled between terminal 8 and an output terminal 7. Output terminal 7 of integrated circuit 88 is also connected to an input terminal 92 of a signal processing circuit 93.

Terminal 94 of a switch 95 is coupled through a resistor 96 to input terminal 97 of the signal processor 93. Terminal 94 of switch 95 is also coupled through resistor 96 and the parallel combination of capacitor 100 and resistor 101 to ground. The other terminal 102 of switch 95 is connected to a source of positive potential. The output terminal 103 of signal processor 93 is connected to input terminal 104 of video signal generator 110. The signal generator 110 also provides horizontal and vertical synchronizing signals at the terminals designated HS and VS, respectively. The horizontal synchronizing signals from terminal HS are applied to terminals 24 and 25.

The output terminal 111 of video signal generator 110 is connected to terminal 106 of a video amplifier 105. Output 107 of video amplifier 105 is connected to terminal 112 of a kinescope 113. Horizontal and vertical deflection coils 114 and 115, respectively, are disposed about the neck of kinescope 113. Coils 114 and 115 are driven by horizontal and vertical deflection circuits (not shown). Terminal VY of vertical deflection coil 115 is connected to terminal 12.

The operation of the circuit will now be described. The yoke current from terminal VY of vertical deflection coil 115 having a sawtooth waveform, appears across current-sampling resistor 14, since resistor 14 is in series with the vertical windings of the deflection yoke. The sampled signal then passes through coaxial input cable 11. The function of cable 11, a section of "lossy line" is to protect the remainder of the circuit against any transient pulses or spikes that may appear in the sampled signal. The yoke current sawtooth function is negative during the scanning of the upper raster half and positive during scanning of the lower raster half and is centered about the zero axis, which corresponds to the electrical center of vertical deflection. Operational amplifier 18 is designed to produce a positive output signal in response to a positive input and a negative output signal in response to a negative input signal. Operational amplifier 18 will therefore be in negative latchup when yoke current is negative (top half of raster) and positive latchup when yoke current is positive (bottom half of raster). Diodes 16 and 17 protect operational amplifier 18 in the event the input signal exceeds the overload threshold of the operational amplifier 18 inputs.

The horizontal synchronizing signal from signal generator 110 is applied across inputs 24 and 25. The signal is processed by pi-networks 30 and 41, which act as impedance buffers, before being applied to the inputs of operational amplifier 32. Operational amplifier 32 is configured to provide a negative signal output during the absence of horizontal sync information and a positive signal output in response to the presence of a horizontal sync pulse at the input. Potentiometer 47 is set to determine an input threshold level necessary before operational amplifier 32 will go into positive latchup, thereby guaranteeing that a positive output from operational amplifier 32 will occur only when a horizontal sync pulse is present, and will not occur from transient pulses or noise in the input signal. The output from operational amplifier 32 is applied through resistor 51 to the base of transistor 52.

Transistor 52 is biased by resistor 54 and diode 53 so that it will only turn on when the base is driven by positive signals from both operational amplifier 18 and operational amplifier 32. This occurs at the beginning of the horizontal scan line following the detection of the vertical deflection center zero crossing. Transistor 52 therefore performs the function of a logical AND. While transistor 52 remains off during scanning of the upper raster half, the voltage at the collector remains at the level of the supply; i.e., +15 volts. When transistor 52 turns on during scanning of the lower raster half, the collector voltage will be a signal comprising a series of negative pulses from the 15 volt supply reference. Each negative pulse corresponds to one horizontal scan line. Multivibrator 57, configured as a Schmitt trigger, produces a positive pulse at its output terminal in response to the first negative pulse at the collector of transistor 52. It is desired that this positive pulse continue for the remainder of the lower raster scan in order to prevent multivibrator 57 from being retriggered by another negative voltage spike. Therefore, the pulse duration from multivibrator 57 is set to be slightly longer than the time for scanning one-half of a television field, or approximately 10 milliseconds. The pulse duration is determined by the values of resistor 59 and capacitor 61, according to the manufacturer's specifications of integrated circuit 58.

The leading edge of the pulse from multivibrator 57 causes the collector voltage of transistor 67 to decrease sharply, triggering multivibrator 71. Multivibrator 71 is also configured as a Schmitt trigger. The width of the positive output pulse from multivibrator 71 is set by potentiometer 73 and capacitor 75 to be slightly less than the time of one horizontal line scan, approximately 63 microseconds.

The output pulse from multivibrator 71 is applied to the base of transistor 83, turning transistor 83 on. Transistor 83 quickly becomes saturated. Current flow through the collector causes the collector voltage to approach ground potential during the time transistor 83 is on. This collector current flow causes a pulse to appear at the output of opto-isolator 87 during the time that transistor 83 is on. The pulse from opto-isolator 87 is applied to input terminal 92 of signal processor 93. Signal processor 93 comprises a gate circuit that generates an output only in the presence of a signal from both opto-isolator 87 and switch 95. A +5 volt signal will be present at terminal 102 of switch 95 when a flat-field raster is selected. Switch 95, therefore, is used as a manual disable when line blanking is not desired in a flat-field raster. Signal processor 93 also provides signal shaping to remove noise and shape irregularities from the input signals. The output signal at terminal 103 of signal processor 93 is applied to input terminal 104 of video signal generator 110. Video signal generator 110 provides an output at terminal 111 which, for the sake of drawing simplicity, is applied through video amplifier 105 to one electron gun terminal 112 of kinescope 113 to blank a selected electron beam during horizontal and vertical retrace, and whenever centerline blanking is desired. Signal generator 110 also provides horizontal and vertical synchronizing signals to deflection circuits which in turn drive the horizontal and vertical coils 114 and 115 of the deflection yoke. Horizontal synchronizing signals from signal generator 110 are also applied to terminals 24 and 25 to provide the input to operational amplifier 32.

During operation of the YAM, when a flat-field raster is selected for adjusting purity and raster centering, it is possible to provide a blanked horizontal scan line occurring at the electrical center of the vertical deflection field.

The following is a listing of component values and type designations where appropriate. It is understood that equivalent components may be substituted.

| | |
|---|---|
| Operational amplifier 18, 32 | LF157H |
| Transistor 52, 67, 83 | 2N3440 |
| Resistor 14 | 1 ohm |
| Resistor 15 | 100 kilohms |
| Resistor 20 | 100 kilohms |
| Resistor 21 | 10 kilohms |
| Resistor 22 | 5.1 kilohms |
| Resistor 34 | 1 megohm |
| Resistor 35 | 1 megohm |
| Resistor 36 | 1 megohm |
| Resistor 44 | 1 megohm |
| Resistor 45 | 1 megohm |
| Resistor 46 | 1 megohm |
| Resistor 50 | 10 kilohms |
| Resistor 51 | 5.1 kilohms |
| Resistor 54 | 10 kilohms |
| Resistor 55 | 270 ohms |
| Resistor 59 | 13 kilohms |
| Resistor 63 | 1,800 ohms |
| Resistor 65 | 10 kilohms |
| Resistor 70 | 270 ohms |
| Resistor 77 | 1,800 ohms |
| Resistor 81 | 10 kilohms |
| Resistor 84 | 1,600 ohms |
| Resistor 91 | 1 kilohm |
| Resistor 96 | 100 ohms |
| Resistor 101 | 100 ohms |
| Potentiometer 47 | 100 kilohms |
| Potentiometer 73 | 20 kilohms |
| Capacitor 26 | .01 microfarad |
| Capacitor 33 | 10 picofarads |
| Capacitor 37 | .01 microfarad |
| Capacitor 43 | 10 picofarads |
| Capacitor 60 | .01 microfarad |
| Capacitor 61 | .82 microfarad |
| Capacitor 62 | .022 microfarad |
| Capacitor 74 | .01 microfarad |
| Capacitor 75 | 4,700 picofarads |
| Capacitor 90 | .01 microfarad |
| Capacitor 100 | 100 microfarads |

When using the above-described circuit to provide a blanked horizontal scan line in order to align the electrical center of deflection with the physical center of the kinescope display screen, it should be noted that the horizontal blanked line is located slightly below the electrical deflection center, due to the fact that the circuit blanks the line following the deflection center zero crossover. The blanked line will then be located one line below the actual deflection center. Additionally, since the zero crossover will be sensed in each field of a video frame, one line will be blanked in each field. This causes two lines to be blanked per frame, giving the appearance of a single thick line on the display, which reduces the precision to which the raster can be aligned.

There are several ways to reduce the inaccuracy of alignment due to displaced blanked lines and/or multiple blanked lines in a frame.

One method of solving the problem that occurs due to the fact that the blanked line is below the actual electrical center of vertical deflection is to modify the circuit as shown in FIG. 1A and apply a slight negative bias to the inverting input of operational amplifier 18. This is done by using potentiometer 116 connected between terminal 13 and a source of negative potential. This causes the reference level of the inverting input to be altered slightly with respect to the noninverting input. Operational amplifier 18 will then produce a positive output while the electron beam is still scanning in the upper raster half. By careful setting of the bias level of potentiometer 116, operational amplifier 18 can be made to generate an output during the horizontal scan line occurring immediately preceding the electrical zero crossing. By blanking the line following the sensed "zero crossing" line, the blank line will then correspond to the actual deflection center line. It has been found that a bias offset of approximately $-7$ millivolts with a toroidally-wound vertical coil will cause the blanked line to occur during the previous scan line; i.e., each $-7$ mv of bias causes the blanked line to move up one line on the display. A fixed resistor providing the necessary bias could be used in place of potentiometer 116. The use of a variable bias such as provided by potentiometer 116 could also be used in conjunction with a reticle placed on the display screen. The actual vertical deflection center could be located by collapsing the vertical scan, and its position noted on the reticle. The horizontal blanked line could then be made to coincide with this position by adjusting the bias level to operational amplifier 18.

In order to eliminate the lack of alignment precision caused by having two lines blanked per frame, it is possible to prevent line blanking during one of the two fields per frame. The two fields are distinguishable; i.e., one field begins at the start of a horizontal line while the other field starts in the middle of a scan line. By providing a coincidence detector using horizontal and vertical synchronizing signals to identify the desired field, it is possible to provide an output signal, which when combined with the output from operational amplifier 18, will turn on transistor 52 only during one of the two fields.

To eliminate the problem of the blanked line occurring one line after the actual electrical center, it is also possible to provide a counting circuit which essentially looks ahead to the next frame for the blanked line. Since each frame comprises 525 lines in the NTSC system, by counting 524 lines before blanking, the blanked line would occur at the actual electrical deflection center, although delayed one frame. Analogously, counting circuits could also be provided for systems using a different number of scan lines per frame.

We claim:

1. A television raster centering aid comprising:
   means for forming a flat-field raster on a television display screen including means for deflecting an electron beam horizontally and vertically across said screen in a predetermined pattern;
   means coupled to said deflecting means for detecting the time of occurrence of substantially minimum vertical deflection of said electron beam and generating a signal as an indication thereof; and
   means responsive to said signal for interrupting said flat-field raster formation by blanking a horizontal scan line of said raster.

2. The television raster centering aid defined in claim 1, wherein said horizontal scan line subject to blanking occupies a region of said raster in which said beam is subject to substantially minimum vertical deflection.

3. The television raster centering aid defined in claim 1 wherein said raster forming means comprises a deflection yoke including horizontal and vertical deflection windings, and wherein the means for detecting the time of occurrence of substantially minimum vertical deflection of said electron beam comprises means for comparing a voltage indicative of the magnitude of current in said vertical deflection winding with a fixed reference potential.

4. The television raster centering aid defined in claim 3 wherein said comparing means detects the time of occurrence of the horizontal scan line interval during which the magnitude of said current passes through zero.

5. The television raster centering aid defined in claim 3 wherein said comparing means detects the time of occurrence of the horizontal scan line interval immediately preceding the horizontal scan line interval during which the magnitude of said current passes through zero.

6. The television raster centering aid defined in claim 1 wherein the blanking means incorporates means for precluding the blanking of said horizontal scan line during alternate raster fields.

7. A television raster centering aid comprising:
   means for forming a raster on a television display screen by deflecting an electron beam horizontally and vertically across said screen in a predetermined pattern;
   means coupled to said raster forming means for detecting the time of occurrence of substantially minimum vertical deflection of said electron beam and generating a first signal as an indication thereof;
   a source of horizontal synchronizing signals;
   threshold means, coupled to said detecting means and to said source, and responsive to the simultaneous presence of said first signal and a horizontal synchronizing signal from said source, for generating a third signal as an indication of the beginning of the horizontal scan line following said detected time of occurrence of substantially minimum vertical deflection;
   means, responsive to said third signal, for generating a signal for blanking said horizontal scan line.

8. A method for vertically centering the raster on a television display screen, comprising the steps of:
   forming said raster on said display screen by deflecting an electron beam horizontally and vertically across said display screen;
   detecting the time of occurrence of substantially minimum vertical deflection of said electron beam and generating a signal as an indication thereof;
   blanking a horizontal scan line of said raster in response to said signal, said scan line occupying a region of said raster in which said beam is subject to substantially minimum vertical deflection; and
   aligning said blanked horizontal scan line with the center of said television display screen.

* * * * *